United States Patent
Scholl

[11] 3,981,416
[45] Sept. 21, 1976

[54] APPARATUS FOR MELTING AND DISPENSING THERMOPLASTIC MATERIAL

[75] Inventor: Charles H. Scholl, Vermilion, Ohio

[73] Assignee: Nordson Corporation, Amherst, Ohio

[22] Filed: June 4, 1975

[21] Appl. No.: 583,586

Related U.S. Application Data
[63] Continuation-in-part of Ser. No. 549,189, Feb. 12, 1975.

[52] U.S. Cl. ............................ 222/146 R; 222/334
[51] Int. Cl.² ........................................... B67D 5/62
[58] Field of Search ..... 222/146 H, 146 R, 146 HE, 222/146 C, 385 X, 334; 401/1, 2

[56] References Cited
UNITED STATES PATENTS

| | | | |
|---|---|---|---|
| 2,694,980 | 11/1954 | Lauck et al. | 222/385 X |
| 3,285,475 | 11/1966 | Phillips | 222/146 R |
| 3,377,466 | 4/1968 | Paulsen | 222/146 R |
| 3,826,224 | 7/1974 | Baker et al. | 222/146 R |

*Primary Examiner*—Allen N. Knowles
*Assistant Examiner*—Hadd Lane
*Attorney, Agent, or Firm*—Wood, Herron & Evans

[57] ABSTRACT

An apparatus for melting and dispensing thermoplastic material comprising a hopper, a grid melter, a reservoir and a pump. At least a portion of the hopper is enclosed within a shroud so as to define an air flow chamber around the lower end of the hopper. Air is forced through this chamber when the apparatus is in use so as to cool the hopper and prevent molten material from backing up into the hopper.

7 Claims, 7 Drawing Figures

APPARATUS FOR MELTING AND DISPENSING THERMOPLASTIC MATERIAL

This application is a continuation-in-part application of my U.S. Pat. application Ser. No. 549,189, filed Feb. 12, 1975.

This invention relates to apparatus for melting and dispensing thermoplastic material and more particularly to an apparatus for melting and dispensing a large volume of thermoplastic adhesive material with minimal degradation of the molten material prior to application by a dispenser.

Conventionally, thermoplastic adhesives or so-called "hot melt" adhesives are converted from a solid to a molten state in a tank having heated walls. The melted material is maintained in the molten state in the tank in sufficient volume to supply one or more applicators or dispensers. If the job or application requires a substantial volume of hot melt adhesive, a sufficiently large volume of material must be maintained in the molten or melted state to meet that need. That substantial volume usually necessitates a long warm-up or start-up time for the apparatus as well as prolonged exposure of at least some of the molten material to heat and/or to oxygen.

Most thermoplastic adhesive materials oxidize, char or degrade when exposed to heat for a prolonged length of time and/or when exposed to oxygen for any appreciable length of time. Consequently, it is desirable to minimize the time that an applicator system maintains the melted material in a molten state. This minimal duration molten state of the adhesive material can be accomplished by balancing of the melt rate of the system with the application rate.

In my U.S. Pat. application Ser. No. 549,189, of which this application is a Continuation-in-Part application, there is disclosed an apparatus for melting and dispensing a high throughput of thermoplastic materials. That apparatus includes a melter having a very high melt rate and a pump having a high capacity for pumping very viscous materials.

I have found that the high melt rate and the efficiency of the melter of the above identified application have created an unforeseen problem with some materials when the apparatus in in use but is not dispensing molten material at the rate for which it is designed. In that event, the melter is operative to melt greater quantities of the thermoplastic material than is used, with the result that the molten material fills the molten material reservoir, the melter and eventually backs up or "melts back" into the hopper. If the apparatus is then turned off or shut down with molten material contained in the hopper, that molten material solidifies and is then difficult or requires a long time to remelt with the result that it may form a bridge across the walls of the hopper and thereby block infeed of solid stock from the hopper into the melter.

It has therefore been a primary objective of this invention to prevent melt back of molten material into the hopper and consequent "bridging" of solid thermoplastic material across or between the walls of the hopper.

Another objective of this invention has been to limit the quantity of molten material contained within the reservoir by preventing melt back of molten material into the hopper. These objectives are accomplished by providing the melting and dispensing apparatus with a device for maintaining the material at the bottom of the hopper at a temperature substantially below the solidification temperature of the material. So long as the walls of the hopper are maintained below the solidification temperature of the material, the material cannot melt back into the hopper and bridge the inside walls.

According to the practice of this invention, melt back of molten material into the hopper is prevented by providing an air chamber defining shroud around the bottom of the hopper and maintaining a flow of forced air through the air chamber when the apparatus is in use. This forced air flow over the walls of the hopper, cools the hopper and maintains it at a temperature substantially below the melting temperature of the thermoplastic feedstock. In one embodiment a continuous flow of air through the air chamber is maintained by a fan mounted in the wall of the shroud. In another embodiment, the pump of the apparatus is driven by a rotary air motor and the exhaust of this air motor serves as the source of forced air into the air chamber. The particular source of air flow to the chamber is not critical to the practice of the invention. The important point is that the air flow be sufficient in quantity and the thermal conductively of the walls of the hopper be such that heat is dissipated away from the hopper at a faster rate than heat can be input or supplied to the walls by incoming molten feedstock.

These and other aspects of this invention will be more readily apparent from the following description of the drawings in which:

FIG. 4 is a cross sectional view taken on line 4—4 of FIG. 3.

Figure 1:
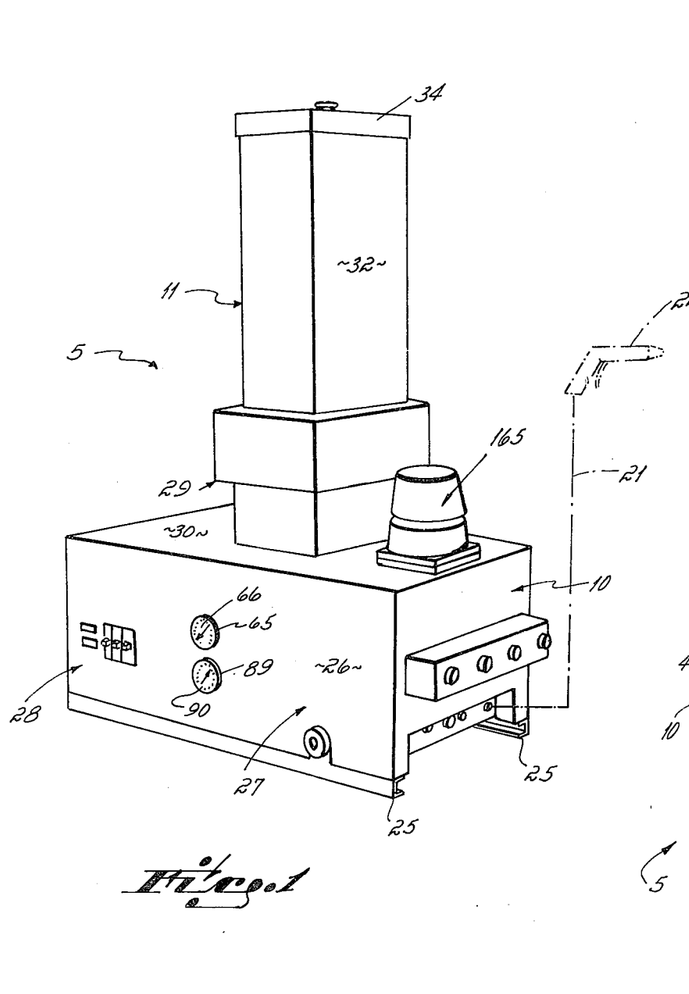
FIG. 1 is a perspective view of one embodiment of a thermoplastic material melting and dispensing apparatus incorporating the invention of this application.
Figure 2:
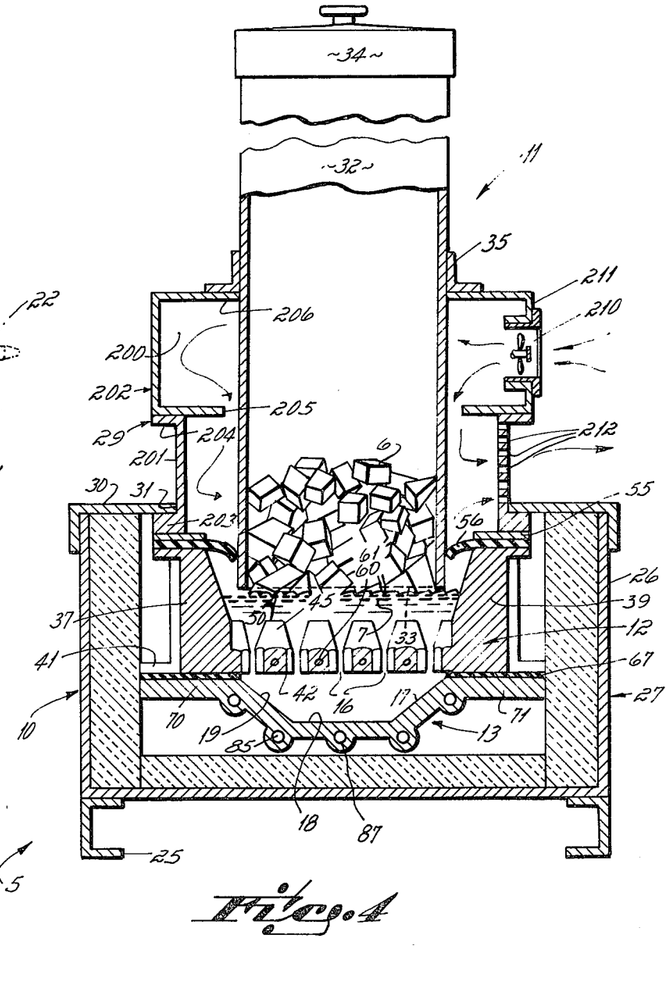
FIG. 2 is an exploded perspective view of a portion of the apparatus of FIG. 1.

Referring first to FIGS. 1 and 2, it will be seen that the thermoplastic material melting and dispensing apparatus 5 of this invention comprises a housing 10 within which there is located a hopper 11, a grid melter 12, a reservoir 13, a gear pump 14, and a manifold block 15. Solid thermoplastic material 6 in the form of chunks (FIG. 4), pellets (FIG. 6), or blocks are placed in the top of the hopper 11 from which they flow through the open bottom into contact with the top surface of the grid melter 12. The grid melter 12 is heated so that surface contact of the solid thermoplastic material with the top surface of the grid causes the solid thermoplastic material to be melted and converted to a molten state. The molten thermoplastic material 7 then flows downwardly through bottom passageways 16 in the grid melter into the reservoir 13 located immediately beneath the melter 12. The reservoir has sloping bottom walls 17, 18 and 19 which direct the molten toward the inlet 20 of the pump 14. The pump then moves the molten material into the manifold block 15 from whence it is directed to one or more conventional applicators or dispensers 22 via hoses or conduits 21.

HOUSING, HOPPER

The housing 10 comprises a sheet metal base plate 25 and a cover 26 mounted atop the base plate. The cover 26 encloses two sections of the applicator, the melt section 27 and the control section 28. The two sections are separated by an insulative barrier (not shown). Within the control section 28 are all of the electrical components for controlling the temperature of the components throughout the system. These controls form no part of the invention of this application and are conventional in commerically available equipment, as for example equipment of the type shown in U.S. Pat. No. 3,792,901, issued Feb. 19, 1974 and assigned to the assignee of this application.

The top 30 of the cover has an opening 31 into which there is fitted the hopper 11 and a surrounding shroud 29. The hopper comprises a vertical tube 32, the bottom 33 of which is open and the top of which is closed by a lid 34. Around the periphery of the hopper there is a flange 35 which is welded or fixed to the exterior of the hopper and which in turn functions as the attachment for the hopper surrounding shroud 29, as is explained more fully hereinafter.

GRID MELTER

Figure 3:
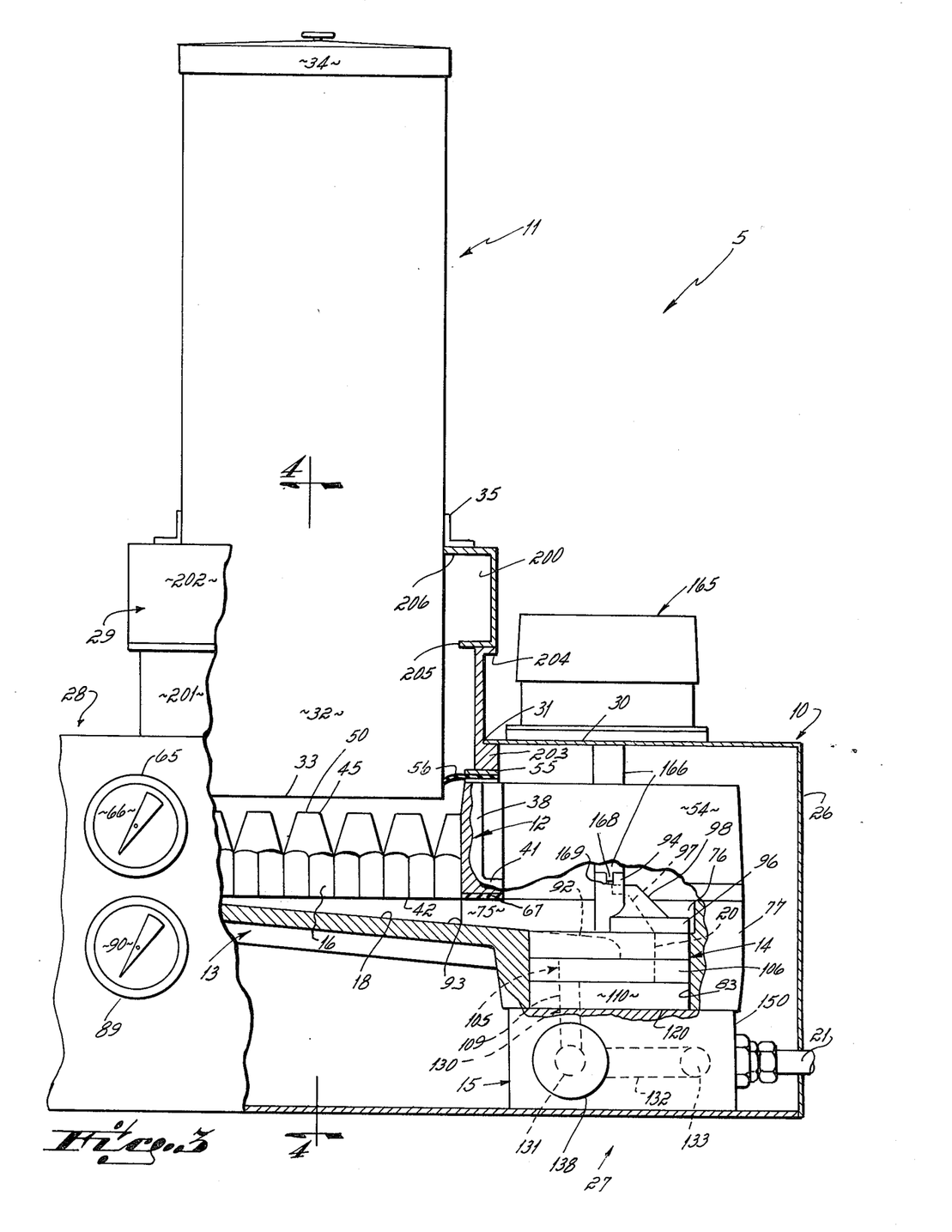
FIG. 3 is a side elevational view, partially broken away, of a portion of the apparatus of FIG. 1.

Referring to FIGS. 2, 3 and 4, it will be seen that the grid melter 12 comprises a receptacle into which solid thermoplastic material flows from the hopper 11. This receptacle comprises four side walls 37, 38, 39 and 40 and a bottom flange 41. The bottom itself comprises a plurality of vertical protrusions or heater elements 43, each one of which is hexagonal in cross section at the base 42 and has an upper end shaped as a truncated cone. The protrusions are arranged in longitudinal rows 44 with the base 42 of each protrusion 45 interconnected and integral with the adjacent protrusions 45 of the same row 44. The protrusions 45 of adjacent rows 44 are longitudinally offset from each of the protrusions of the adjacent rows such that when viewed in top plan the protrusions create a staggered pattern or rows and columns, but with the protrusions of the columns spaced apart and separated by an intermediate row of protrusions. There are open passageways 16 located on opposite sides of each row and extending for the length of the row. These passageways 16 open into the top of the reservoir 13.

In the melting of thermoplastic materials it is critical that the melter have a large surface area in contact with the poor heat conductive blocks or pellets of thermoplastic material. Prior to this invention attempts have been made to increase the surface area by forming ribs on the bottom of the grid melter as in U.S. Pat. No. 3,531,023. The grid melter 12 of this invention incorporating the truncated cone shaped heater elements has been found to increase the throughput of the grid melter over rib type grids by as much as 30 or 40% while maintaining the same surface temperature of the grid so as to avoid degrading of the material.

The protrusions are formed as truncated cones or pyramids having flat or blunt topmost end surfaces 50. As used throughout this application and in the claims the term "cone" is used in the generic sense to include pyramids which have anywhere from three to an infinite number of sides. When the pyramid has an infinite number of sides it is of course circular in cross section.

The truncation or blunting of the topmost surface 50 of the "cone" increases the area in contact with the solid thermoplastic material and enables the surface termperature of the complete "cone" to be evenly maintained with a minimal power input.

In one preferred embodiment the grid melter 12 is formed as an integral casting. This casting has three lugs 52 formed on each end wall and a pair of lugs 53 formed on each of the front and rear walls. Each lug is vertically bored to accommodate bolts (not shown) for mounting the grid melter upon the top of the reservoir 13 and securement of a gasket hold-down plate 55 to the top of the grid melter. A gasket 56 is clamped between the top of the grid melter and the hold-down plate 55. It extends inwardly into contact with the side walls of the hopper tube 32 so as to form a seal to prevent gases from escaping around the edge of the hopper to the atmosphere. The gasket 56 also enables the hopper 11 to be evacuated or to maintain a blanket of inert gas over the top of the thermoplastic material. Such evacuation of the hopper or maintenance of an inert blanket are employed in some applications to retard or minimize degradation of the molten material.

In the illustrated embodiment the grid melter has an integral annular boss 54 extending forwardly from its front wall. The boss 54 also has three lugs 57 equidistantly spaced about its outer wall and bored as illustrated at 58 to accommodate bolts (not shown) for mounting the grid melter atop the reservoir.

There are nine horizontal bores 60 which extend through the front wall and through the base portions of each row of heater element protrusions 45. An electrical resistance heater 61 is mounted within each of these bores 60 so that one heater extends into and through the bases of each row of frustoconical heater elements. There is also a bore 63 which extends through the rear wall of the melter within which a temperature sensor device (not shown) is mounted. This device is used to control and maintain the temperature of the heater elements 61 at a preset temperature. There is also a transverse bore 64 formed in the rear wall of the grid melter block. This transverse bore accommodates a conventional temperature measuring guage 65, the front face 66 of which is located upon the control panel of the housing 26.

RESERVOIR

The reservoir 13 comprises an open top, closed bottom receptacle which is fixedly secured to the bottom of the grid melter. Preferably there is an insulative gasket 67 located between the top of the reservoir 13 and the bottom of the grid melter 12. The reservoir has shallow side walls 70, 71 and a shallow rear wall 72. The front wall 73 is slightly deeper such that the bottom of the reservoir slopes downwardly from the front and side walls toward a front opening 75 in the front wall 73. This opening 75 functions as the entrance for molten material into a blind recess 76 formed in a pump mounting boss 77 of the reservoir. The blind recess 76 of the pump mounting boss 77 is intersected by a vertical bore 83 which extends from the bottom of the boss 77 into the recess 76. The pump 14 is located within this bore 83 and bolted to the manifold block 15.

The boss 77 has a base portion 78, the bottom flat surface of which rests atop and is supported by the manifold block 15. The manifold block in turn rests upon and is supported from the base 25 of the housing. The manifold block 15 and pump mounting boss 77 of the reservoir are secured together by bolts (not shown) which extend through and are threaded into aligned vertical bores.

Figure 5:
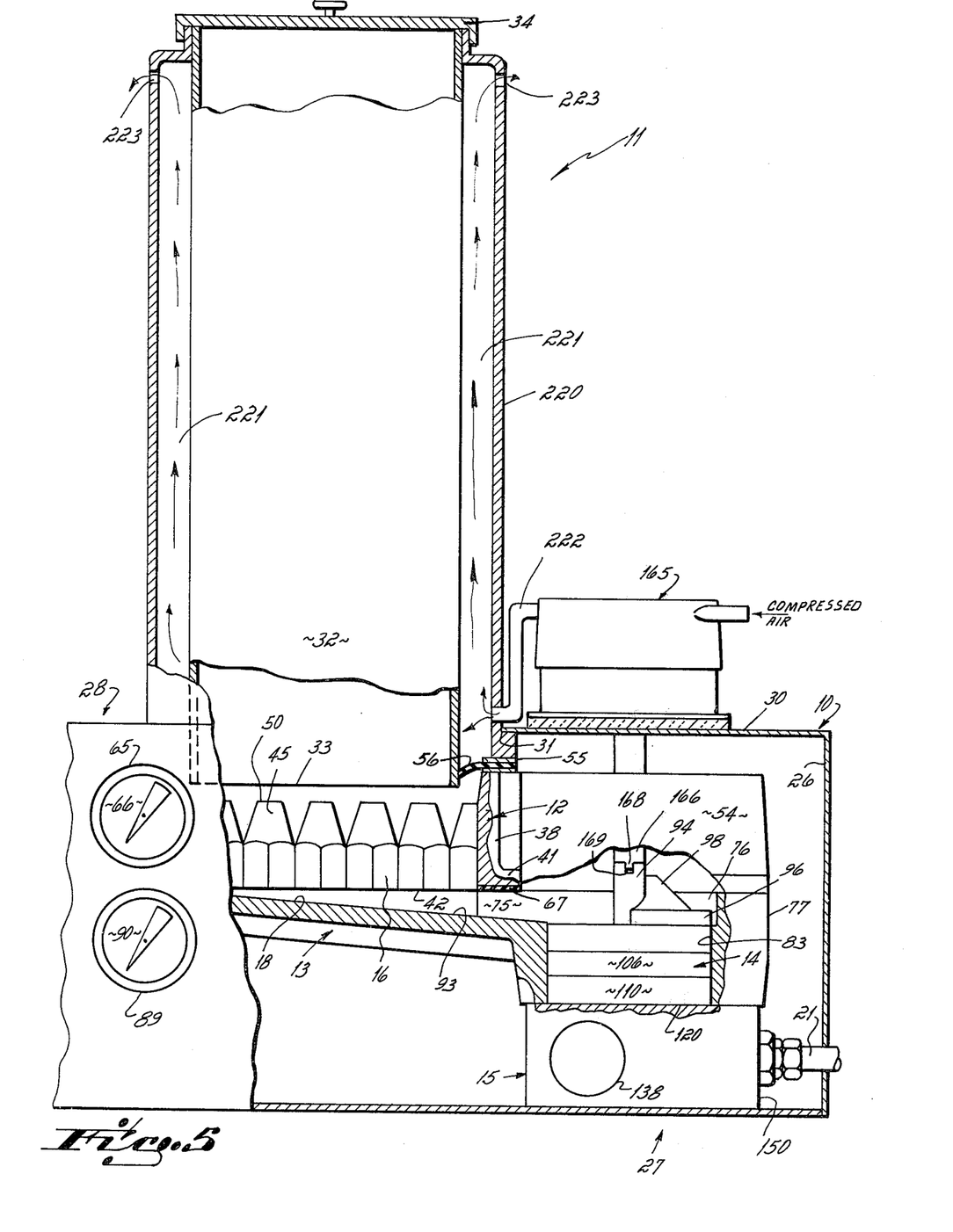
FIG. 5 is a cross sectional view, similar to FIG. 4, but illustrating a second embodiment of the invention.

In the preferred embodiment there are two identical U-shaped resistance heaters 85 molded within the bottom walls 17, 18 and 19 of the reservoir. There is also a tube 87 molded within the bottom wall 18. A temperature sensor is inserted into the tube 87 and is utilized to control the flow of electrical current to the heaters 85 so as to maintain the bottom wall at a preset temperature. There is also a transverse bore 82 located beneath the side wall of the reservoir. The bore 82 accommodates a conventional temperature measuring gauge 89, the front face 90 of which is located on the control panel of the housing 26. The heaters 85, as shown in FIG. 5, are positioned on opposite sides of the pump 14 to insure uniform heating of the pump 14 and manifold 15.

PUMP

The pump 14 has a top surface 92 which is co-planar with and forms a continuation of the sloping surface 93 of the reservoir bottom wall 18. In the preferred embodiment it slopes at an angle of approximately 5° to the horizontal plane. The slope is such that the natural flow of molten material over the bottom wall of the reservoir is toward the pump inlet 20.

The pump 14 comprises a pair of counter-rotating shafts 94, 95 which extend above the top surface 92 of the pump and which tend because of their rotation to force material between the two toward an overhanging rear wall 97 formed on the inside of an overhanging hood 98. The wall 97 overhangs the entrance port 20 of the pump and slopes toward the entrance port so that material contacting the wall 97 is caused to flow toward the inlet port 20 of the pump.

The remainder of the pump, other than the end plate 96 and the associated infeed mechanism comprises a pair of interconnected gears 103, 104 which are drivingly keyed to a drive shaft 94 and idler shaft 95. These gears rotate within a generally four leaved clover-shaped recess 105 of the gear stator 106. One "leaf" 107 of the clover-shaped opening in the stator 106 is open to communicate with the inlet port 20 and the opposite "leaf" 108 of the recess communicates with an outlet port 109 of a lower end plate 110. The other "leaves" 111 and 112 of the clover-shaped recess 105 accommodate the counter-rotating interengaged gears.

The lower end plate 110 includes in addition to the outlet port 109, a pressure balancing port 115 which extends through the end plate 110 and communicates with a pressure balancing port 116 of the manifold block 15. Additionally, the end plate 110 includes a pair of vertical apertures 117 and 118 which accommodate the lower ends of the shafts 94, 95 and function as bearings or journals for those lower ends. Between the bottom surface 120 of the end plate 110 and the top surface of the manifold block 15 there is a conventional O-ring 121 which fits within a semi-circular cross sectional annular ring 122 in the top surface of the manifold block. This O-ring 121 functions as a seal between the bottom surface of the reservoir 13 and the top surface of the manifold 15. Except for this seal between the manifold and the reservoir 13 there are no gaskets or seals. While leakage does occur around the periphery of the shafts 94, 95 within the pump that leakage is accommodated by permitting it to flow through a T-shaped slot 123 in the top surface of the manifold block back to the inlet or suction side of the pump.

With reference to FIG. 2 it will be seen that the T-shaped slot 123 interconnects the vertical bores 117, 118 of the lower end plate as well as the vertical port 115 of the end plate. Consequently, leakage of molten material flowing between the rotating shafts 94, 95 and the inside surface of the bores 117, 118 is simply routed through the T-shaped slot 123 back to the suction side of the pump through the connecting bore 115 of the pump end plate 110.

The pump 14 is secured to the top of the manifold block by bolts (not shown) which extend vertically through vertical bores 126, 127. In the preferred embodiment of the pump, spacer sleeves (not shown) are located within the bores 126, 127 between the bolts and the inner surfaces of the bores 126, 127.

MANIFOLD BLOCK

The manifold block 15 is ported such that the molten material flowing from the outlet port 109 of the pump flows into the vertical inlet port 130 of the manifold. This inlet port communicates with a longitudinal passage 131, a transverse passage 132, a longitudinal passage 133 on the front side of the block and outlet ports 134 and 135. Conventional dispensers, as for example conventional hot melt applicator guns or dispensers of the type shown in U.S. Reissue Pat. No. 27,865 or U.S. Pat. No. 3,690,518 may be attached to the outlet ports 134, 135 of the manifold block, either directly or by conventional heated hoses. The number of outlet ports and connected dispensers will vary depending upon the particular application to which the system is applied.

Intersecting the longitudinal passageway 131 and extending coaxially with it there is a filter mounting bore 137. This bore accommodates a conventional filter, one end of which comprises a plug 138 threaded into a threaded end section 139 of the bore 137. A complete description of the filter assembly may be found in U.S. Pat. No. 3,224,590 which issued Dec. 21, 1965.

Intersecting the longitudinal passage 133 there is a one-way check valve mounting bore 149 which extends inwardly from the front surface 150 of the manifold block into communication with the pressure balancing port 116. This check valve mounting bore also intersects the longitudinal passage 133 in the front of the manifold. Threaded into the bore 149 there is a conventional pressure relief one-way check valve (not shown).

PUMP DRIVE SYSTEM

The pump 14 may be driven in rotation by any conventional type of drive motor 165 and interconnected drive shaft 166. In the preferred embodiment illustrated in FIGS. 1–4, the motor drive shaft has a key 168 on its outer end which fits within a key-way slot 169 at the upper end of the pump drive shaft 94. The motor 165 is mounted atop the cover 26 of the housing, and is a rotary pneumatic motor driven by conventional shop air pressure and operative to effect rotation of the shaft 166 at a predetermined speed through a conventional gear reduction unit mounted interiorly of the motor housing.

HOPPER MELT BACK PREVENTION

The thermoplastic material melting and dispensing apparatus heretofore described except for the shroud 29 is completely disclosed in my co-pending application Ser. No. 549,189, of which this application is a Continuation-in-Part. The invention of this application resides in the provision of means for preventing molten material melted by the grid melter 12 from backing up into the hopper 11. If the feedstock material is melted by the grid melter 12 at a faster rate than it is dispensed through the dispenser 22, this condition can occur. To prevent such melt back the shroud 29 is located over and spaced from the bottom exterior walls of the hopper so as to provide an air chamber 200 through which forced air may be continually moved when the apparatus 5 is in use. That air flow is operative to dissipate or carry heat away from the exterior walls of tube 32 of the hopper 11 at a faster rate than heat may be imparted to those walls by incoming molten thermoplastic material from the melter 12. Consequently, the cool walls 32 of the hopper act as a thermal barrier to prevent back-up of molten material into the hopper.

The shroud 29 comprises a base section 201 and an upper section 202. The base section consists of four interconnected side walls which are spaced outwardly from the vertical walls 32 of the hopper, a lower flange 203, and an upper flange 204. The lower flange 203 extends outwardly from the bottom surface of the base section 201 and rests atop the gasket hold-down plate 55.

The upper section 202 of the shroud also has four vertical walls spaced outwardly from the walls 32 of the hopper, a lower flange 205, and an upper flange 206. The lower flange of the upper section 202 extends inwardly from the four side walls of the upper section 202 and rests atop the outwardly extending flange 204 of the bottom section 201. The top flange 206 of the top section 202 extends inwardly into contact with the exterior surface of the side walls 32 of the hopper. In the preferred embodiment, the lower section 201 of the shroud is bolted or otherwise fixed to the top section 202 and to the top of the grid melter by conventional connectors (not shown). The hopper 11 is simply inserted into the shroud and forced downwardly until the flange 35 of the hopper abuts the top flange 206 of the shroud. The flange 35 is generally not bolted or otherwise fixed to the shroud so that the hopper can easily be removed by simply pulling it upwardly through the top of the shroud.

In the embodiment of FIGS. 1–4, a conventional electrical motor driven fan 210 is mounted within one side wall 211 of the upper section 202 of the shroud 29. This fan is operative to blow a continuous stream of forced air through the interior of the shroud and out through orifices 212 in the bottom section 201 of the shroud so long as the melting and dispensing apparatus 5 is in use.

I have found that the side walls 32 of the hopper 11 ara preferably made from aluminum so as to facilitate heat transfer away from and out of the hopper side walls by the continuously moving air stream from the fan 210. If the air stream is to prevent bridging of molten material within the hopper resulting from the molten material freezing therein, the air flow through the chamber 200 must be capable of dissipating heat at a faster rate than it may be imparted to the side walls 32 by incoming molten material. Construction of the side walls of the hopper from aluminum facilitates this dissipation of heat from the side walls by the forced air flowing over the exterior surface.

Referring now to FIG. 5 there is illustrated a second preferred embodiment of an apparatus for preventing melt back of molten material from the grid melter 12 into the bottom of the hopper 11. In this embodiment, the upper end of walls 32 of hopper 11 is welded or otherwise supportingly secured to the upper end of shroud 220. In this embodiment, rather than utilizing the fan 210 to force air through the air flow chamber 221 between the interior surface of the shroud and the exterior surface of the walls 32 of the hopper 11, exhaust air from the pneumatic motor 165 is supplied via a conduit 222 to the chamber 221. This exhaust air then is caused to move upwardly through the chamber over the exterior walls 32 of the hopper and out through ports 223 in the shroud.

Compressed air drives the motor 165. As the compressed air is exhausted from the outlet of the air motor and the conduit 222, it expands rapidly into the cooling chamber 221 thereby cooling, generally to a temperature at or below 32°F. Therefore, exhaust air from the air motor 165 continually chills or cools the sidewalls 32 of hopper 11 as it passes upwardly over the outer surfaces of walls 32.

Figures 6, 7:
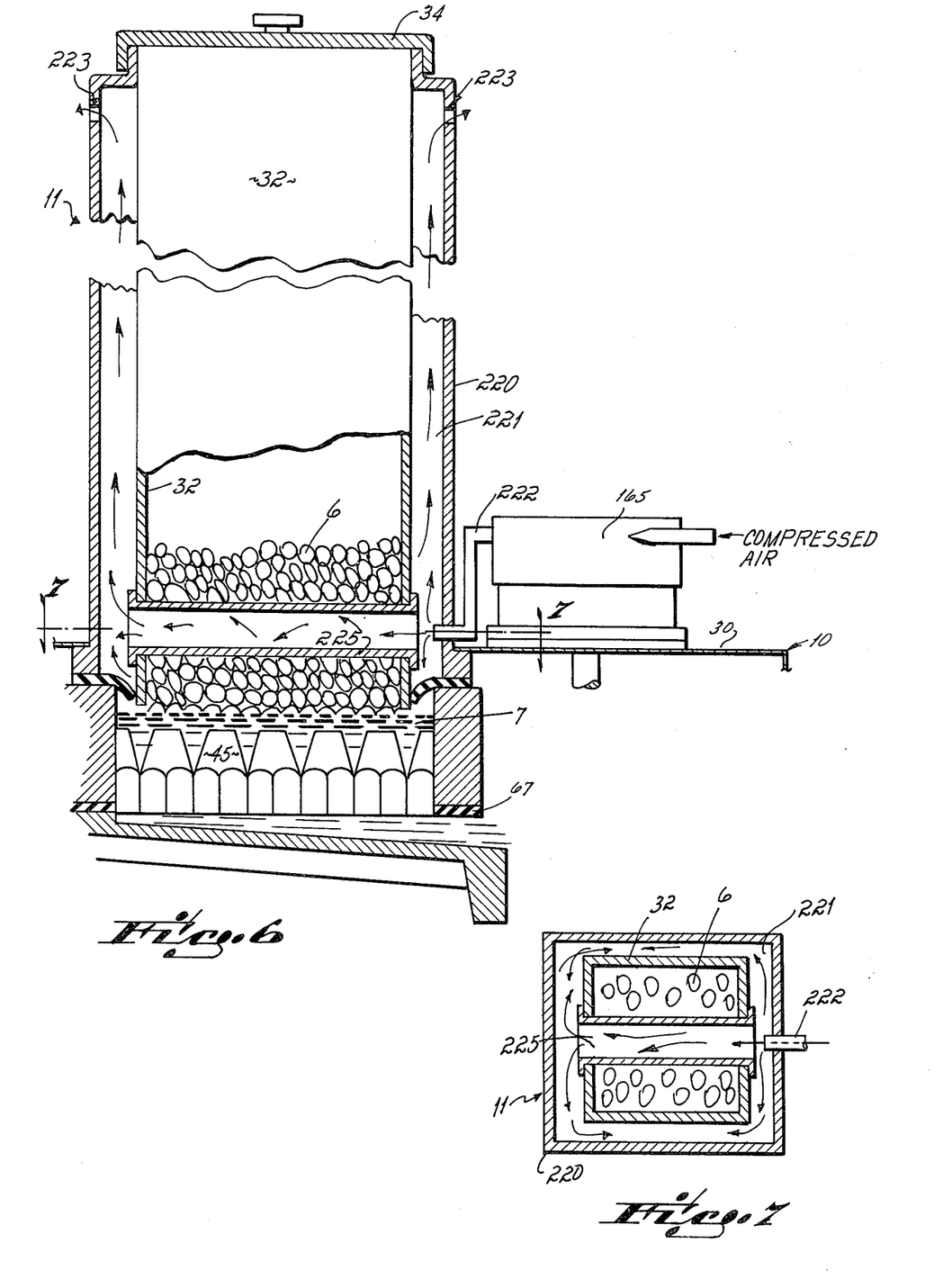
FIG. 6 is a fragmentary view in section, similar to FIG. 5, but illustrating a third embodiment of the invention.
FIG. 7 is a cross sectional view taken on line 7—7 of FIG. 6.

Referring now to FIG. 6 there is illustrated a third embodiment which is, a further modification of the apparatus illustrated in FIG. 5 of the drawings. In this embodiment, the exhaust air from motor 165 flows into the cooling chamber 221 and at least a portion of the air from conduit 222 is directed into a cooling tube 225. This tube 225 extends transversely between and is affixed to the side wall 32 of the hopper 11. It is located directly in the path of the air stream emitted from the conduit 222 into the chamber 221 so that most of the cool exhaust air from the conduit is forced to flow through the cooling tube. In the course of passing through the tube, the cool exhaust air extracts heat from the solid thermoplastic material disposed within the lower end of the hopper as well as from the tube and the connecting hopper walls.

The primary advantage of this invention resides in its elimination of "bridging" or forming of a solid barrier across and between the inside surface of the walls of a feed hopper of a thermoplastic melting and dispensing apparatus. The elimination of this melt back into the hopper eliminated the problem of the apparatus feed being temporarily disabled by a solid barrier of feedstock contained within the hopper when the apparatus is turned off and then subsequently restarted.

While I have disclosed only three embodiments of my invention, persons skilled in the art to which this invention pertains will readily appreciate changes and modifications which may be made in the invention. Therefore, I do not intend to be limited except by the scope of the following appended claims.

Having described my invention, I claim:
1. An apparatus for converting solid thermoplastic material to molten thermoplastic material and for dispensing the molten thermoplastic material, comprising
   a housing including a hopper having side walls for receiving solid thermoplastic material,
   a flow through grid melter having a continuous side wall, a bottom wall, and a open top for receiving said solid thermoplastic material from said hopper, said bottom wall comprising a plurality of spaced heating sections,
   a plurality of discharge openings in said bottom wall of said grid melter between said spaced heating sections, a reservoir mounted beneath said grid melter and adapted to receive molten material from said discharge openings of said grid melter,
means for heating said bottom wall of said grid melter,
a dispenser operable to dispense said molten thermoplastic material,
a pump for supplying said molten thermoplastic material from said reservoir to said dispenser, and
cooling means for maintaining said hopper side walls below the solidification temperature of said molten material so as to prevent the melt back of molten material from said grid melter into said hopper, said cooling means comprising
a shroud surrounding at least the lower portion of said hopper, said shroud defining an air chamber between the inner walls of said shroud and the outer walls of said hopper, and air flow means for supplying a flow of forced air through said air chamber so as to cool the lower portion of said hopper.

2. The apparatus of claim 1 which further includes a flexible seal extending between the inside wall of said shroud and the outside wall of said hopper, said flexible seal being located adjacent the bottom of said hopper.

3. The apparatus of claim 1 in which said air flow means includes a motor driven fan mounted in the wall of said shroud.

4. The apparatus of claim 1 which further includes a pneumatic motor for driving said pump, said pneumatic motor having an inlet adapted to be connected to a source of air pressure and an exhaust, and
said air flow means for supplying a continuous flow of air through said air chamber comprising a conduit connecting said pneumatic motor exhaust to said air chamber.

5. The apparatus of claim 4 which further includes conduit means disposed inside of said hopper, and
said conduit means being located adjacent to and in the path of air from one end of said conduit connecting said pneumatic motor exhaust to said air chamber.

6. The apparatus of claim 4 which further includes conduit means disposed inside of and supported by said hopper.

7. The apparatus of claim 6 in which said hopper and conduit means in said hopper are made from aluminum.

* * * * *

UNITED STATES PATENT AND TRADEMARK OFFICE
CERTIFICATE OF CORRECTION

PATENT NO. : 3,981,416
DATED : Sept. 21, 1976
INVENTOR(S) : Charles H. Scholl

It is certified that error appears in the above-identified patent and that said Letters Patent are hereby corrected as shown below:

Col. 2, line 24, "conductively" should be -- conductivity --

Col. 2, line 66, between "molten" and "toward" insert -- material --

Col. 3, line 14, "commerically" should be -- commercially --

Col. 4, line 3, "termperature" should be -- temperature --

Col. 4, line 11, "reservior" should be -- reservoir --

Col. 4, line 43, "guage" should be --gauge --

Signed and Sealed this

Fifteenth Day of February 1977

[SEAL]

Attest:

RUTH C. MASON
Attesting Officer

C. MARSHALL DANN
Commissioner of Patents and Trademarks